United States Patent [19]

Chmiel et al.

[11] Patent Number: 5,928,703
[45] Date of Patent: Jul. 27, 1999

[54] SOLUBLE BEVERAGE POWDER

[75] Inventors: Oliver Chmiel, Orbe; Heinz Wyss, Oberdiessbach, both of Switzerland; Hanspeter Maier, Moerfelden, Germany

[73] Assignee: Nestec S.A., Vevey, Switzerland

[21] Appl. No.: 09/086,734

[22] Filed: May 29, 1998

[30] Foreign Application Priority Data

Jul. 14, 1997 [EP] European Pat. Off. ............... 97111934
Aug. 1, 1997 [EP] European Pat. Off. .............. 97202410

[51] Int. Cl.$^6$ .............. A23F 5/00; A23C 1/187; A23C 17/00; A23C 9/16
[52] U.S. Cl. ................... 426/594; 426/580; 426/584; 426/588
[58] Field of Search .................... 426/590, 594, 426/650, 580, 588, 583, 584

[56] References Cited

U.S. PATENT DOCUMENTS 3,458,319  7/1969  Block et al. ................... 99/71
3,653,911  4/1972  Manucuso et al. ................ 99/71
3,706,572  12/1972  Einstman et al. ................. 99/71
5,620,733  4/1997  Chaveron et al. ............... 426/580

FOREIGN PATENT DOCUMENTS 154 192   2/1985   European Pat. Off. .
2301015  11/1996   United Kingdom .

*Primary Examiner*—Anthony J. Weier
*Attorney, Agent, or Firm*—Pennie & Edmonds LLP

[57] ABSTRACT

A soluble beverage powder which, upon reconstitution with water, provides a beverage simulating a coffee drink which contains a small amount of cream. The soluble beverage powder is made up of a soluble coffee powder; and a soluble creamer-containing powder. The creamer-containing powder contains pre-flocculated creamer solids and at least about 10% by weight of soluble coffee solids. The soluble creamer-containing powder has a color similar to that of the soluble coffee powder such that the soluble beverage powder has a substantially homogeneous color. The soluble beverage powder contains a total amount of soluble coffee of at least 25% by weight.

15 Claims, No Drawings

SOLUBLE BEVERAGE POWDER

FIELD OF THE INVENTION

This invention relates to a soluble beverage powder which, upon reconstitution with water, provides a beverage simulating a coffee drink which contains a small amount of cream.

BACKGROUND OF THE INVENTION

A beverage made up of coffee and a small amount of cream or coffee cream, is popular in many markets. The beverage has a deep brown color which is ordinarily characteristic of a dominant coffee flavor but the beverage has a creamy mouthfeel. This beverage may be reproduced using soluble coffee powder but liquid cream or milk must be added. However it would be more convenient for many consumers if the entire beverage may be produced from a soluble beverage powder.

It is of course possible to merely mix together a soluble coffee powder and an appropriate creamer powder to provide a soluble beverage powder having the coffee and creamer in the correct proportions. However, the soluble beverage powder obtained does not provide an acceptable solution. In particular, the soluble coffee powder and the creamer powder are prone to separate to some extent during storage. Therefore it is difficult to ensure that the soluble beverage powder is completely homogeneous. Also the soluble beverage powder does not have a homogeneous color. Further, upon reconstitution, the milk proteins in the creamer tend to flocculate and this severely affects consumer perception of the product.

Further, it is not possible to produce an acceptable product by simply mixing together a liquid creamer and a coffee extract and then drying the mixture to powder. Although the powder obtained will be homogeneous, when reconstituted, flocculated milk proteins are very visible in the beverage obtained. The flocculated milk proteins severely affect consumer acceptability. The problem of flocculation of the milk proteins in coffee beverages has been satisfactorily dealt with in U.S. Pat. No. 5,620,733. This patent describes a process in which the milk proteins are subjected to a controlled flocculation step during processing. Subsequently to the controlled flocculation step, the liquid creamer and a small amount of coffee extract are subjected to homogenization and drying to provide a creamer powder. Further soluble coffee powder is then dry mixed in with the creamer powder. After processing in this way, any flocculated milk proteins in the reconstituted beverage are too small to be visible.

However, the soluble beverage powder produced by the process described in U.S. Pat. No. 5,620,733 is intended to simulate a milky coffee beverage. Hence the total amount of soluble coffee in the soluble beverage powder is relatively small; for example about 15% by weight. The soluble beverage powder, when reconstituted, therefore does not provide a beverage simulating a coffee drink which contains a small amount of cream. Also, although the soluble beverage powder has a much better appearance than a dry mixture of coffee powder and creamer, the creamer powder is lighter than the soluble coffee powder and hence the soluble beverage powder do not have a completely homogeneous color.

Therefore there is a need for a soluble beverage powder which is substantially homogeneous in color and which, upon reconstitution with water, provides a beverage simulating a coffee drink which contains a small amount of cream.

SUMMARY OF THE INVENTION

In one aspect, this invention provides a soluble beverage powder which comprises:

a soluble coffee powder; and a soluble creamer-containing powder, the creamer-containing powder comprising pre-flocculated creamer solids and at least about 10% by weight of soluble coffee solids so that the total amount of soluble coffee solids in the soluble beverage powder is at least 25% by weight, the soluble creamer-containing powder having a color such that the soluble beverage powder has a substantially homogeneous color.

Preferably the soluble creamer-containing powder includes an aroma substrate carrying coffee aroma; for example a coffee oil which contains coffee aroma.

In a further aspect, this invention provides a soluble beverage powder which comprises:

about 10% to about 25% by weight of a soluble coffee powder; and about 90% to about 75% by weight of a soluble creamer-containing powder the creamer-containing powder comprising pre-flocculated creamer solids, at least about 10% by weight of soluble coffee solids, and an aroma substrate carrying coffee aroma, the soluble creamer-containing powder having a color such that the soluble beverage powder has a substantially homogeneous color.

In another aspect, this invention provides a process of preparing a soluble beverage powder, the process comprising:

subjecting a concentrated creamer solution which contains protein, carbohydrate, lipids and at least about 10% by weight of soluble coffee solids, based on the weight of the soluble beverage powder, to heat treatment to cause flocculation of protein;

homogenizing and drying the treated creamer solution to provide a soluble creamer-containing powder; and mixing the soluble creamer-containing powder with a soluble coffee powder to provide a soluble beverage powder that has a substantially homogeneous color and which contains at least about 25% by weight of soluble coffee solids.

DETAILED DESCRIPTION OF THE PREFERRED EMBODIMENTS

Embodiments of the invention are now described by way of example only. The invention is a soluble beverage powder which is made up of at least two powder types: a soluble coffee powder; and a soluble creamer-containing powder. However, the two powder types have substantially the same color. Also, when reconstituted, the soluble beverage powder provides a beverage which simulates a coffee drink which contains a small amount of cream but without the formation of visible protein flocculation.

The soluble coffee powder may be any suitable spray- or freeze-dried coffee powder. Such coffee powders are commercially available or may be produced by conventional extraction and drying techniques. Spray-dried powder is preferred. If desired, the coffee powder may be in the form of an agglomerated powder produced, for example, using the procedure described in U.S. Pat. No. 5,400,972 (the disclosure of which is incorporated by reference). If desired, the soluble coffee powder may contain coffee substitutes such as chicory.

The soluble coffee powder is present in an amount to raise the total amount of coffee solids in the soluble beverage powder to at least 25% by weight; for example about 30% by weight and up to about 35% by weight. However, the soluble coffee powder is preferably present in an amount of at least about 10% by weight; for example about 12% to about 25% by weight.

The soluble creamer-containing powder is a homogeneous powder which contains both soluble coffee solids and creamer solids. The soluble coffee solids are present in an amount of at least about 10% by weight (based on the weight of the soluble beverage powder); preferably about 10% to about 18% by weight. An amount of about 11% to about 15% by weight is particularly preferred. The creamer solids may be any suitable creamer solids with the condition that they have subjected to pre-flocculation treatment.

Conventionally, the creamer solids contain protein, carbohydrates and lipids. These may be provided in a variety of forms. For example, the creamer solids may be a dairy creamer produced from whole milk. In this case, the creamer solids are made up of milk proteins, lactose and milk fats. Alternatively, the milk fats may be replaced by suitable vegetable fats such as coconut fats.

The non-fat milk solids preferably provide about 15% to about 40% by weight of the creamer mixture; for example about 25% to about 35% by weight. The non-fat milk solids may be obtained from fresh skimmed milk or skimmed milk powder.

The creamer solids may also contain sweet whey. If used, the sweet whey preferably provides about 1% to about 20% by weight of creamer mixture; for example about 5% to about 15% by weight. The sweet whey is preferably provided in the form of sweet whey powder. Sweet whey powder usually contains a mixture of lactose and whey protein; for example about 80% by weight of lactose and about 12% by weight of whey protein.

Lactose may also be added if desired. If lactose is added, the total amount of lactose preferably comprises about 20% to about 40% by weight; for example about 25% to about 35% by weight. The lactose may be provided in any suitable form; for example in the form of pure or substantially pure lactose or in the form of sweet whey powder which contains large amounts of lactose.

The lipid component may be any suitable edible oil or fat. Milk fat or bland vegetable oils or fats such as coconut oil are preferred. The lipid component preferably makes up about 5% to about 25% by weight of the creamer mixture; for example about 10% to about 20% by weight.

If desired, the creamer solids may include a sweetener. However, the use of significant quantities of a sweetener is not preferred. If used, the sweetener may be any suitable food grade sweetener; for example those conventionally used in the production of powdered creamers. Examples of suitable sweeteners are sugars such as glucose syrup, corn syrup, sucrose, dextrose, fructose, maltodextrin, and the like, and mixtures of these sugars. Glucose syrup is particularly suitable, especially syrups having a DE in the range of about 35 to about 42. Maltodextrin, either alone or in combination with other sugars, may also be used. The sweetener may also contain artificial sweeteners such as saccharin, cyclamates, acetosulfame, L-aspartyl based sweeteners such as aspartame, and mixtures of these. If an artificial sweetener is used, it is suitably combined with bulking agents such as maltodextrins and polydextrose.

The soluble beverage powder preferably includes an aroma substrate which carries an aroma; especially coffee aroma. The coffee aroma used may be any suitable coffee aroma; natural or synthetic. However natural aromas collected during the preparation of soluble coffee powder are preferred. Procedures for collecting the aromas are well known. Usually they entail flushing the volatile aromas from the coffee during processing using an inert carrier gas such as nitrogen. The aroma-laden carrier gas is then chilled to temperatures lower than −40° C., and sometimes as low as −195° C., to cause the aromas to condense. The condensed aromas are then collected. The condensed aromas are then usually absorbed into the aroma substrate. Alternatively, the aromas may be absorbed into the aroma substrate during condensation. Suitable procedures for carrying out the condensation and absorption steps are disclosed in, for example, U.S. Pat. Nos. 3,823,241, 5,030,473, and 5,222,364 (the disclosures of which are incorporated by reference).

The aroma substrate is preferably a edible, bland vegetable oil or fat. Suitable examples are coffee oil and coconut fat. Coffee oil is particularly preferred. The aroma substrate preferably makes up about 0.3% to about 5% by weight of the soluble beverage powder; for example about 0.5% to about 1.5% by weight.

If desired, the soluble beverage powder may also contain suitable emulsifiers; although this is not necessary. Suitable emulsifiers may be selected from monoglycerides, distilled monoglycerides, diglycerides, glycerol monostearates, sorbitol monostearates, esters or carbocyclic acids with mono- and di-glycerides, monosodium phosphate derivatives of mono- and di-glycerides, lecithin, diacetyl tartaric acid esters of mono-diglycerides (data esters), sorbitan esters, diacetyl tartaric acids esters of mono- and di-glycerides, succinylated mono- and di-glycerides acetylated mono- and di-glycerides, hydroxylated lecithin, propylene glycol mono- and di-esters of fatty acids, polyglycerol esters of fatty acids, lactylic esters of fatty acids, and mixtures thereof. If used, the emulsifiers are preferably included in the soluble creamer-containing powder.

The soluble beverage powder may also contain suitable stabilizers; for example dipotassium phosphate and sodium citrate. However the use of stabilizers is in general not necessary. If stabilizers are used, the amount of stabilizers used may be in the range of about 0. 1% to about 5% by weight of the soluble beverage powder.

Suitable flavoring agents, coloring agents, flowing agents, antioxidants, and the like may also be included as desired. A suitable flowing agent is sodium silica aluminate.

The soluble beverage powder may be produced from the soluble coffee powder and the soluble creamer-containing powder by any suitable technique. For example, by dry mixing the powders or subjecting the powders to agglomeration using, for example, the procedure described in U.S. Pat. No. 5,400,972.

The soluble creamer-containing powder is conveniently produced by preparing a standardized creamer solution containing the desired amount of protein, carbohydrate and lipids. For example, for a creamer mixture made up of non-fat milk solids, sweet whey or lactose, and a lipid component, a standardized creamer solution may be prepared by combining skimmed milk, sweet whey or lactose, and the lipid component in selected proportions to obtain a solution of desired fat and solids content. Water may be added as necessary.

The standardized solution is then heat treated at about 90° C. to about 120° C. for about 1 to about 500 seconds; for example at about 105° C. to about 115° C. for about 5 seconds to about 20 seconds. This may be carried out in a heat exchanger or by direct injection of steam, or a combination of both. The standardized solution is then concentrated by evaporation; usually to a total solids concentration of about 40% to about 60% by weight. Suitable evaporators may be used.

A coffee solution may then be added to the concentrated creamer solution. The coffee solution may be a concentrated coffee extract obtained from a coffee extraction process or may be prepared by dissolving coffee powder into a desired amount of water. The concentration of the coffee solids in the coffee solution is preferably similar to the concentration of the creamer solids in the concentrated creamer solution. The amount of the coffee solution which is added to the concentrated creamer solution is sufficient for these coffee solids to provide at least 10% by weight of the final soluble beverage powder; for example about 11% to about 15% by weight.

The concentrated mixture is then subjected to a pre-flocculation treatment. The pH of the concentrated mixture is, if necessary, standardized to about 5.5 to about 6.5; preferably about 6.1 to about 6.4. Also, if necessary, the calcium content of the mixture may be standardized to about 3 to about 5 mmol/l. The aroma substrate may then be mixed into the standardized mixture.

The mixture is then subjected to heat treatment at about 90° C. to about 120° C. for about 1 to about 500 seconds; for example at about 105° C. to about 1 15° C. for about 5 seconds to about 20 seconds. This may be carried out in a heat exchanger or by direct injection of steam, or a combination of both. This heat treatment causes controlled flocculation of proteins in the mixture.

It is also possible to carry out the pre-flocculation treatment on the concentrated creamer solution prior to addition of the coffee solution, but this is less preferred. Further details of possible processing variants are described in U.S. Pat. 5,620,733.

The mixture is then subjected to homogenization. This is preferably carried out in two stages. For example homogenization may be carried out in a first stage at about 10 MPa to about 30 MPa and then in a second stage at about 2 MPa to about 7 MPa.

If the aroma substrate was not added earlier, it may be mixed into the homogenized mixture at this stage. The homogenized mixture is then pumped to the spray nozzle of a spray drier, usually at a pressure of about 2.5 MPa to about 15 MPa, and sprayed into the drier chamber. Hot air at a temperature of about 200° C. to about 400° C. is then used to dry the droplets. The soluble beverage powder obtained may then be agglomerated if desired.

If the aroma substrate is not added to the homogenized mixture prior to spray-drying, a suitable aroma substrate may be mixed into the soluble beverage powder at this stage. Powdered aromas are particularly suitable to be added at this stage. Any desired sweeteners, stabilizers, flavoring agents, and the like may also be mixed in at this stage.

The soluble creamer-containing powder thus obtained, due to the relatively high concentration of soluble coffee solids, has a brown color which is very similar to the color of soluble coffee powder. Consequently the soluble beverage powder has a substantially homogeneous color. Also, when reconstituted in water, the soluble beverage powder provides a coffee beverage with little or no visible protein flocculation. Further, the coffee beverage has a deep brown color and a flavor which simulates a coffee beverage made up of coffee with a little cream or coffee cream.

EXAMPLE 1

Coffee aroma is captured according to the process described in U.S. Pat. No. 5,222,364 and combined with coffee oil. A creamer-containing powder is produced from a standardized solution containing non-fat milk solids, sweet whey powder, and coconut fat. The standardized solution is preheated to about 85° C. in a plate heat exchanger and then heated to 105° C. for 5 seconds by injection of steam. The heated solution is then concentrated to a solids content of about 48% to about 50% by weight in a falling film evaporator.

The temperature of the concentrated creamer solution is adjusted to about 70° C. in a plate heat exchanger and a coffee solution is added to the concentrated creamer solution. The coffee solution has a solids concentration of about 45% by weight. Sufficient coffee extract is added such that the coffee solids in the creamer-containing powder provide about 15% by weight of the final product.

The mixture is heated to about 105° C. for about 10 seconds by injection of steam. The coffee oil which contains the coffee aroma is added to the mixture and the mixture is then homogenized in two stages; at about 11 MPa and then at about 5 MPa. The homogenized mixture is transferred to a spray drying tower and dried by spraying with air at 335° C. under a pressure of 15.7 kPa on entry.

The creamer-containing powder is then mixed with soluble coffee powder to provide a soluble beverage powder. The soluble beverage powder contains about 15% by weight of soluble coffee powder and about 85% by weight of the beverage creamer powder. Therefore the total amount of soluble coffee solids present is about 30% by weight. The soluble beverage powder is substantially homogeneous in color.

About 12 g of the soluble beverage powder is placed in a glass beaker and 150 ml of water at 85° C. is added with stirring. The resulting beverage has a good, brown coffee color and a good coffee aroma and flavor. A creamy mouth-feel is present. No flocculation is observed.

EXAMPLE 2

Coffee aroma is captured according to the process described in U.S. Pat. 5,222,364 and combined with coffee oil. A creamer-containing powder is produced from a standardized solution containing non-fat milk solids, lactose, and coconut fat or milk fat. The standardized solution is preheated to about 73° C. in a plate heat exchanger and then heated to 1 15° C. for 10 seconds by injection of steam. The heated solution is then concentrated to a solids content of about 48% to about 50% by weight in a falling film evaporator.

The temperature of the concentrated creamer solution is adjusted to about 73° C. in a plate heat exchanger and a coffee solution is added to the concentrated creamer solution. The coffee solution has a solids concentration of about 45% by weight. Sufficient coffee extract is added such that the coffee solids in the creamer-containing powder provide about 10% to about 15% by weight of the final product. The coffee oil which contains the coffee aroma is added to the mixture.

The mixture is heated to about 105° C. for about 10 seconds by injection of steam. The heated mixture is then homogenized in two stages; at about 13 MPa and then at about 4 MPa. The homogenized mixture is transferred to a spray drying tower and dried by spraying with air at 320° C. under a pressure of 11 to 12 MPa on entry.

The creamer-containing powder obtained is then mixed with soluble coffee powder to provide a soluble beverage powder. The composition of the soluble beverage powder is as follows:

| Component | Powder 1 (% by weight) | Powder 2 (% by weight) | Powder 3 (% by weight) |
| --- | --- | --- | --- |
| Soluble coffee powder | 13.0 | 13.0 | 17.6 |
| Soluble creamer powder | | | |
| Coffee solids | 13.0 | 13.0 | 12.4 |
| Non fat milk solids | 29.5 | 29.5 | 27.9 |
| Lactose | 24.6 | 24.6 | 23.3 |
| Milk fat | 16.4 | — | 15.5 |
| Coconut fat | — | 16.4 | — |
| Aroma substrate | 1.3 | 1.3 | 1.2 |
| Moisture | 2.2 | 2.2 | 2.1 |

| Component | Powder 4 (% by weight) | Powder 5 (% by weight) |
| --- | --- | --- |
| Soluble coffee powder | 22.5 | 22.5 |
| Soluble creamer powder | | |
| Coffee solids | 11.6 | 11.6 |
| Non fat milk solids | 26.3 | 26.3 |
| Lactose | 21.9 | 21.9 |
| Milk fat | 14.6 | — |
| Coconut fat | — | 14.6 |
| Aroma substrate | 0.9 | 0.9 |
| Moisture | 2.2 | 2.2 |

The soluble beverage powders are substantially homogeneous in color.

About 6 g of each soluble beverage powder is placed in a glass beaker and 100 ml of water at 85° C. is added with stirring. The resulting beverage has a good, brown coffee color and a good coffee aroma and flavor. A creamy mouthfeel is present. No flocculation is observed.

We claim:

1. A soluble beverage powder which has a brown, substantially homogeneous color and which comprises:

about 10% to about 25% by weight of a soluble coffee powder; and a soluble creamer containing powder having a color similar to that of the soluble coffee powder, the creamer-containing powder comprising pre-flocculated creamer solids and soluble coffee solids providing at least about 10% by weight of the soluble beverage powder; and the soluble powder and the soluble coffee solids providing at least 25% by weight of the soluble beverage powder.

2. A soluble beverage powder according to claim 1 in which the soluble creamer-containing powder includes an aroma substrate carrying coffee aroma.

3. A soluble beverage powder according to claim 2 in which the aroma substrate is coffee oil.

4. A soluble beverage powder according to claim 2 which contains about 0.5% to about 2% by weight of aroma substrate.

5. A soluble beverage powder according to claim 1 in which the creamer solids comprise non-fat milk solids, sweet whey or lactose, and a lipid component.

6. A soluble beverage powder according to claim 5 in which the lipid component is a vegetable oil or milk fat.

7. A soluble beverage powder according to claim 6 in which the vegetable oil comprises about 5% to about 25% by weight of the creamer solids.

8. A soluble beverage powder according to claim 1 which contains about 12% to about 25% by weight of soluble coffee powder and about 10% to about 18% by weight of soluble coffee solids.

9. A soluble beverage powder which has a brown, substantially homogenous color and which comprises:

about 10% to about 25% by weight of soluble coffee powder; and about 90% to about 75% by weight of a soluble creamer-containing powder, the creamer-containing powder comprising pre-flocculated creamer solids, soluble coffee solids providing at least about 10% by weight of the soluble beverage powder, and an aroma substrate carrying coffee aroma, the soluble creamer-containing powder having a color such that the soluble beverage powder has a substantially homogeneous color; and the soluble coffee powder and the soluble coffee solids providing at least 25% by weight of the soluble beverage powder.

10. A soluble beverage powder according to claim 9 in which the aroma substrate is coffee oil.

11. A soluble beverage powder according to claim 9 which contains about 0.5% to about 2% by weight of aroma substrate.

12. A soluble beverage powder according to claim 9 in which the creamer solids comprise non-fat milk solids, sweet whey or lactose, and a lipid component.

13. A soluble beverage powder according to claim 12 in which the lipid component is a vegetable oil or milk fat.

14. A soluble beverage powder according to claim 13 in which the vegetable oil comprises about 5% to about 25% by weight of the creamer solids.

15. A soluble beverage powder according to claim 9 which contains about 12% to about 25% by weight of soluble coffee powder and about 10% to about 18% by weight of soluble coffee solids.

* * * * *